United States Patent [19]

Ishimatsu

[11] Patent Number: 4,712,636
[45] Date of Patent: Dec. 15, 1987

[54] CARRIAGE FOR WATERCRAFT

[75] Inventor: Tsutomu Ishimatsu, Akashi, Japan

[73] Assignee: Kawasaki Jukogyo Kabushiki Kaisha, Japan

[21] Appl. No.: 868,069

[22] Filed: May 29, 1986

[30] Foreign Application Priority Data

May 29, 1985 [JP] Japan .................................. 60-117535

[51] Int. Cl.⁴ ......................... B60P 3/10; B60K 25/06
[52] U.S. Cl. ..................................... 180/198; 114/270; 114/344; 180/6.2; 180/53.2; 440/12
[58] Field of Search ...................... 180/198, 6.2, 6.48, 180/11, 12, 16, 53.2; 114/11, 270, 344; 440/12

[56] References Cited

U.S. PATENT DOCUMENTS

| | | | |
|---|---|---|---|
| 1,548,664 | 8/1925 | Davis | 180/198 |
| 3,568,624 | 3/1971 | Bjorklund | 114/270 |
| 3,765,368 | 10/1973 | Asbeck | 114/270 |
| 3,827,392 | 8/1974 | Jones | 114/270 |
| 3,853,085 | 12/1974 | Halboth | 114/270 |
| 4,484,646 | 11/1984 | Smith | 180/6.2 |

FOREIGN PATENT DOCUMENTS 554931  1/1957  Italy .................................. 180/198

*Primary Examiner*—John J. Love
*Assistant Examiner*—Everett G. Diederiks, Jr.

[57] ABSTRACT

A carriage adapted for an inboard-type motorboat provided with a power take-off device for a prime mover. The carriage comprises a dolly loading the watercraft, plural wheels inclusive of driving wheels rotatably supported by shafts on the dolly, an input shaft engaging with aforesaid power take-out device, and a power transmission fixed to the dolly to transmit torque of the input shaft to aforesaid driving wheels, and is driven by the torque transmitted from the power take-off device of the watercraft loaded on aforesaid dolly.

2 Claims, 12 Drawing Figures

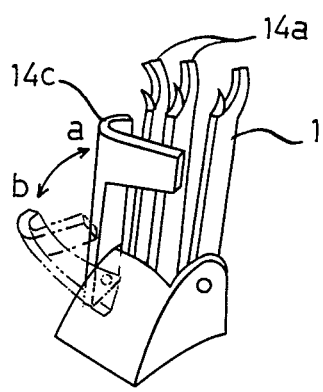
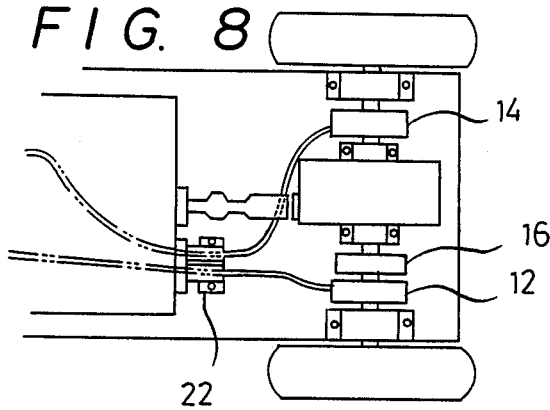
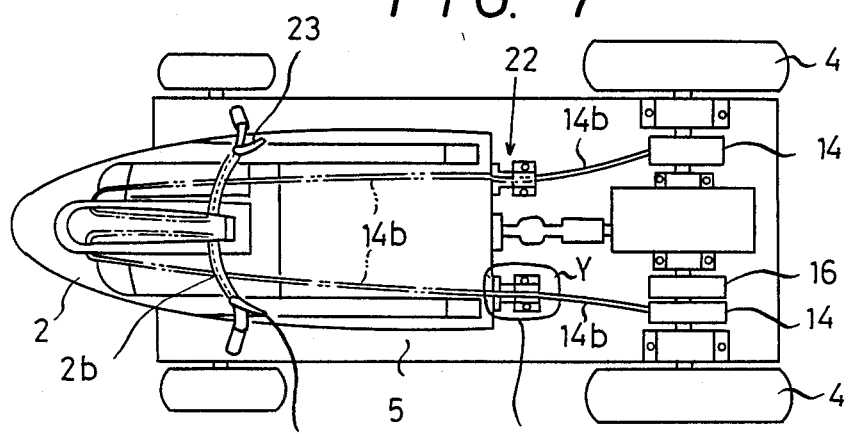
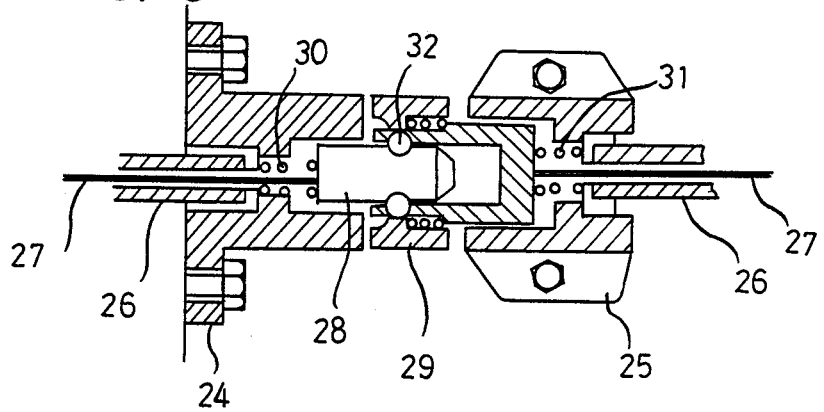

CARRIAGE FOR WATERCRAFT

FIELD OF THE INVENTION AND RELATED ART STATEMENT

This invention relates to a carriage for a watercraft and particularly for an inboard type motorboat.

The inboard type motorboat is often carried by two or more people from a truck to the shore or a garage, but is rather heavy. Recently, the simple hand-cart has been popular for carrying watercraft in short distances.

But, carrying the watercraft manually and loading-/unloading it on/from a truck can not only damage the watercraft, it can also be troublesome. On the other hand, the hand-cart may come in handy because it can be handled by the rider alone, but still is not preferable for use in a long distance transport, because it takes a great deal of labor.

OBJECT AND SUMMARY OF THE INVENTION

In view of the above mentioned problems in the related art, it is the object and purpose of the present invention to provide a carriage for a watercraft which is capable of carrying the watercraft without manual power and and can be used over a long distance as well as over a short distance transport thereof.

To eliminate the aforesaid problems, the watercraft carriage according to the present invention comprises a dolly for loading a watercraft, and which is equipped with a power take-off means, plural wheels (including driving wheels) rotatably supported by bearings on the dolly, and a power transmission provided with an input shaft engageable with the aforesaid power take-off means and which is fixed on the aforesaid dolly so as to transmit the driving force supplied from the input shaft to the aforesaid driving wheels, and is so constructed as to travel under the driving force from the power take-off means of the watercraft loaded on the aforesaid dolly.

BRIEF DESCRIPTION OF THE DRAWINGS

In the accompanying drawings, there are shown illustrative embodiments of the invention from which these and other of its objectives, novel features and advantages will be readily apparent.

In the drawings:

FIG. 6 is a partially enlarged perspective view of a clutch lever of the embodiment in FIG. 5.

FIG. 7 is a plan view of a further embodiment according to the invention.

FIG. 8 is a fragmental plan view of a partly modified version of the embodiment in FIG. 7.

FIG. 9 is a sectional view showing an example of the structure of a coupling in a clutch transmission member for the embodiment in FIGS. 7 and 8.

DETAILED DESCRIPTION OF PREFERRED EMBODIMENTS

Figure 1:
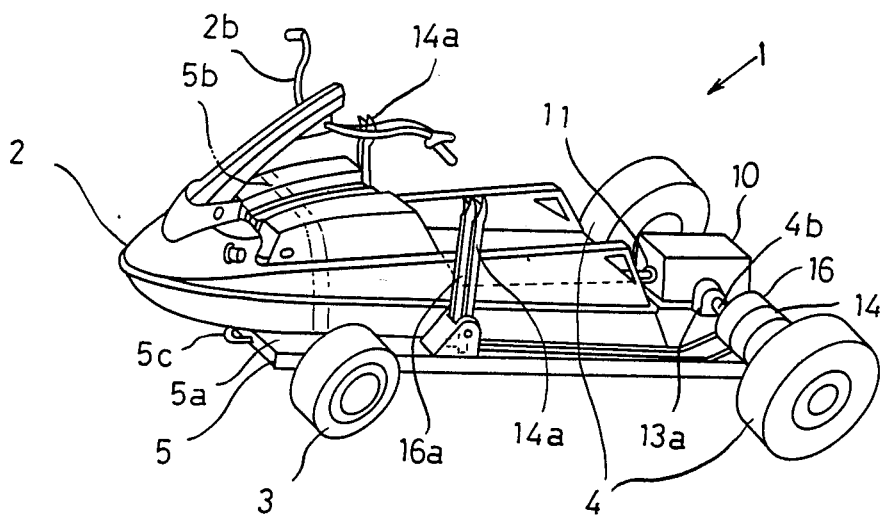
FIG. 1 is a perspective view showing an embodiment of a carriage for a watercraft according to the invention, with the watercraft loaded thereon.
Figure 2:
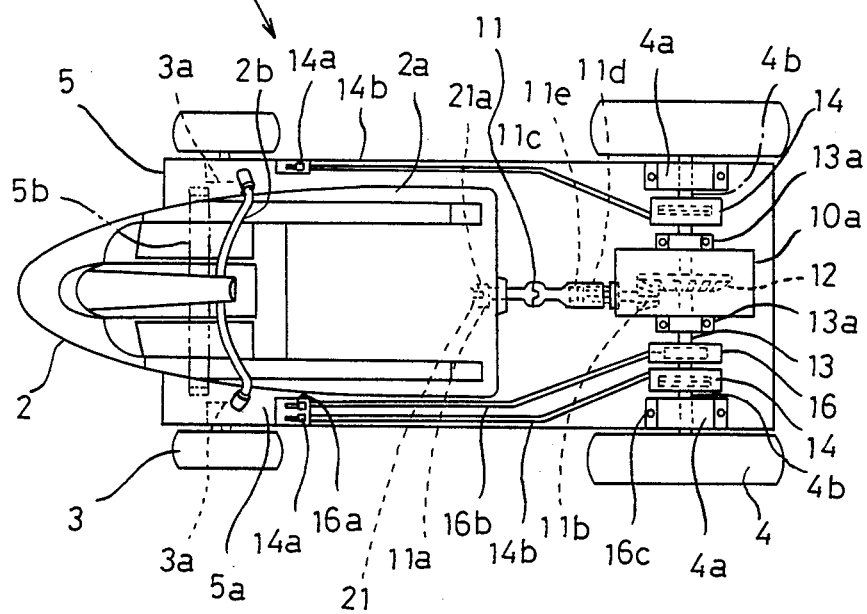
FIG. 2 is a plan view of the embodiment in FIG. 1.

In FIGS. 1 and 2, a carriage 1 adapted for a watercraft according to the invention consists of a dolly 5 for loading the watercraft 2 equipped with a power take-off means 21, rear driving wheels 4 and 4 and front guiding wheels 3 and 3 rotatably supported by bearings on the dolly, and a power transmission 10 provided with an input shaft 11 removably engageable with the power take-off means 21 of the watercraft to be loaded on the dolly 5 and fixed to the dolly 5 so as to transmit the driving force supplied from the input shaft 11 to the driving wheels 4 and 4.

The dolly 5, essentially a rectangular board, is provided with shallow grooves formed to the keel of the watercraft on an upper surface 5a extending from the intermediate portion to the front portion thereof to place the watercraft 2 thereon, a belt 5b fastening the watercraft thereto, and a coupler 5c used when the dolly serves as a trailer. The two front wheels 3 and 3 are respectively fixed to a journal rotatably supported by bearings 3a and 3a disposed on the sides of the dolly 5 near the front end portion thereof. And, the two driving wheels 4 and 4 are respectively fixed to a drive shaft rotatably supported by bearings 4a and 4a disposed also on the sides of the dolly 5 near the rear end portion thereof. Balloon tires or radial tires of great width are employed for the front and driving wheels 3,3 and 4,4 so that the carriage 1 can travel without trouble even in a sandy place, and, further, the bearings 3a and 4a are of a water proof type, because the carriage 1 may sometimes get in the water.

The power transmission 10 is disposed on the dolly 5 in back of the watercraft loading area, and consists of the input shaft 11 provided with a coupler 11a at a front free end thereof and rotatably supported by a bearing on a front wall of a housing 10a, a driving pinion 11b secured at a rear end of the input shaft 11 within the housing 10a, a side gear 12 engaging with the drive pinion 11b to change the torque about the longitudinal axis of the input shaft 11 into the torque about the transverse axis of the driving wheels, an intermediate shaft 13 securing the side gear 12 within the housing 10a and supported by bearings 13a and 13a disposed on the sides of the housing 10a coaxially with shafts 4b and 4b of the driving wheels 4 and 4, and clutches 14 and 14 respectively provided disengageably between the intermediate shaft 13 and the shafts 4b and 4b disposed at the right and left sides thereof. And the power transmission means 10 is designed to be watertight so as never to suffer troubles even if it should get into water. It may be needless to say that a differential gear for use in a car or the like can be applied to a combined structure of the drive pinion 11b and the side gear 12. In the embodiment, however, the differential gear is not used, because the embodiment has selected as steering means a steering system using the right and left clutches 14 and 14 as used in crawler tractors. The clutches 14 and 14 are of a water-proof plate type, normally forced by a spring into engagement, and, for steering, respectively disengaged/engaged by one of the clutch control levers 14a and 14a respectively disposed on the dolly 5 close to and at the right and left sides of the rider's seat on the watercraft 2 loaded on the dolly 5, through control cables 14b and 14b. Braking means 16 is of a friction type in which braking force is applied to a drum set on, for instance, a left side of the intermediate shaft 13, by pressing a shoe 16c disposed on the outer surface of the drum against the drum with a brake lever 16a in juxtaposition to the left clutch control lever 14a through a control cable 16b. A temporary stop of the dolly 5 is made by disengaging the clutch of the watercraft along with the application of the braking means 16. And, since the brake lever 16a is provided with a ratchet mechanism, the braking means 16 can be used as a parking brake after the engine of the watercraft has come to a halt.

Figure 3:
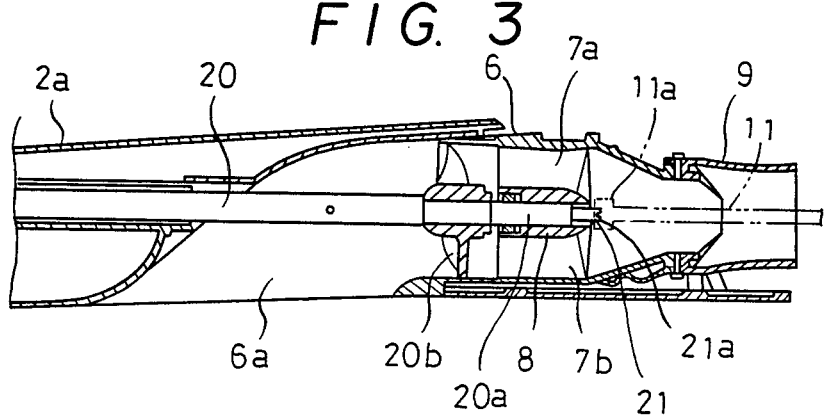
FIG. 3 is a partially enlarged sectional view showing a power take-out means of a watercraft.
Figure 4:
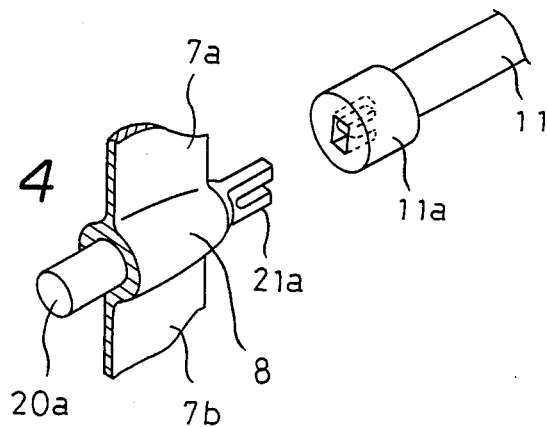
FIG. 4 is a partially enlarged perspective view showing a coupling of a power take-out means of a watercraft, and another coupling of a power transmission of the embodiment.

A universal joint 11c and a spline coupling 11d are set on the intermediate sections of the input shaft 11 to absorb a relative displacement between the carriage 1 and the watercraft 2, and also a spring 11e is inserted into a recess for accomodating the spline coupling 11d to press the coupling 11a constantly against the power take-off means 21 in the watercraft. As shown in FIGS. 3 and 4, the coupling 11a of the input shaft 11d, which has a recess of a flat key-hole shape to fit into a mating member of the power take-out means 21, a projected. A flat key shaped coupling 21a, removably engages with the coupling 21a formed on a portion exposed out of a hub 8 at a stern end portion 20a of an impeller shaft 20.

The watercraft 2 in the embodiment shown in FIG. 1 is of a waterjet driven type, and is designed to drive the impeller shaft 20 with a water-cooled engine disposed at the front portion of a hull 2a made of synthetic resin or other like, to rotate an impeller 20b fixed to the impeller shaft 20 right in front of the hub 8 held at the center of a duct 6 through stays 7a and 7b, and to generate jet stream by drawing water through an intake 6a and guide the jet stream through the duct 6 to a nozzle 9 for propulsion and steerage. The nozzle 9 is designed to interlock through steering cable (not shown) with a steering handle 2b provided on the bow portion so as to swing to the right and to the left.

When the carriage 1 in the embodiment is used as a trailer pulled by a passenger car to carry the watercraft 2 over a long distance, the right and left clutches 14 and 14 are kept disengaged by the ratchet mechanism provided on the clutch levers 14a and 14a, and further electrical appliances (based on the traffic regulation) such as tail lamps and direction indication lamps are installed on the carriage 1.

Waterproof carriages as shown in the embodiment can be driven into shallows to load/unload watercrafts directly onto/from the carriage.

The manual-type clutch and braking mechanisms using control cables are applied in the aforesaid embodiment, but hydraulic ones may also be used.

Figure 5:
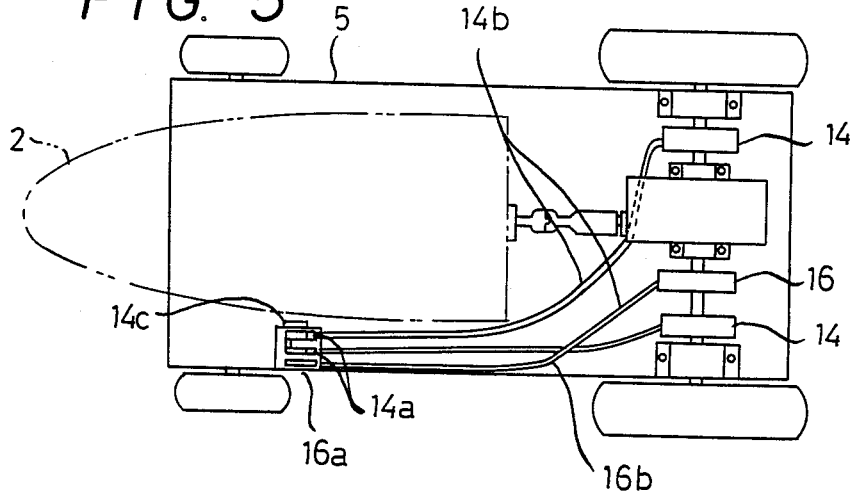
FIG. 5 is a plan view of another embodiment according to the invention.

As shown in FIGS. 5 and 6, the clutch levers 14a and 14a for the clutches 14 and 14 can be disposed together in one position on the dolly 5, also a single common clutch lever 14c connected to the aforesaid two clutch levers 14a and 14a can be provided to engage/disengage simultaneously both the right and left clutches 14 and 14. As the result, when the carriage is being started or stopped, the common lever 14c is maintained in a position shown by sign "a" in FIG. 6 to actuate both the levers 14a and 14a into operation, so that both the clutches can be simultaneously engaged or disengaged by this single action. On the other hand, for steering in the transport of a watercraft on a carriage, the common lever 14c is pulled to a position shown by the sign "b" in FIG. 6 to disengage both the levers 14a and 14a from operation, so that the right and left clutches 14 and 14 respectively can be independently operated according to the respective levers 14a and 14a.

The steering system of the carriage according to the invention is not limited to that by the clutch lever mounted on the carriage shown in aforesaid embodiment.

For instance, in another embodiment, as shown in FIG. 7, clutch control cables 14b and 14b are respectively divided into two parts, a carriage side and a watercraft side, and the two parts are removably connected with joint 22. Clutches 14 and 14 for driving wheels 4 and 4 are respectively interlocked with clutch levers 23 and 23 located on both side ends of a steering handle 2b on the watercraft. In this case, the joints 22 and 22 may be provided at the rear end of the watercraft 2 so that the control cables on the watercraft sides respectively can be automatically connected to the ones on the carriage sides when the watercraft 2 is loaded in place on the carriage.

If the joints 22 and 22 of the control cables are disposed together in one position as shown in FIG. 8, a single bracket can be shared by the two cables to support both the joints.

FIG. 9 shows an example of a construction of the joint 22 of the control cable 14b. A watercraft-side bracket 24 and a dolly-side bracket 25 respectively secure outer cables (sheath cables) 26 and 26 of the control cables on the exposed sides opposite to each other, while, on the inner sides facing each other, a pin 28 and a receptor 29 (respectively with inner cables 27 installed) engageable with each other can be slipped into each other by the aid of respective compression springs 30 and 31 housed in the brackets.

The pin and the receptor are integrally connected by detent balls 32 when engaged with each other, which enables the inner cables 27 of the both sides to move as one piece.

Figure 10:
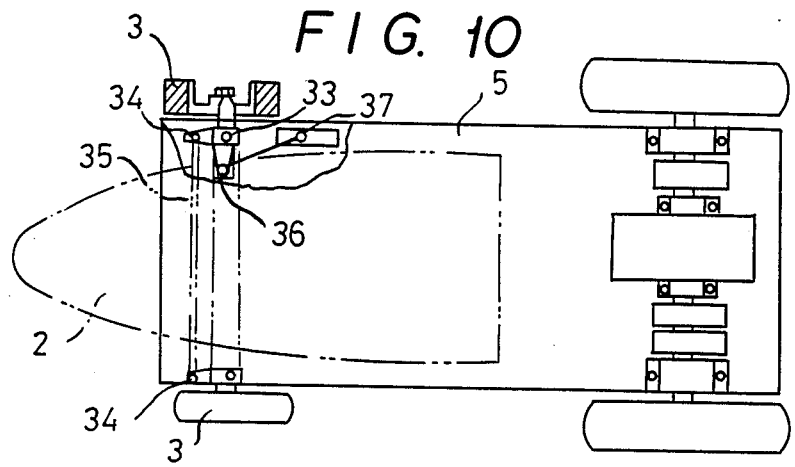
FIG. 10 is a plan view of a still a further embodiment according to the invention.
Figure 11:
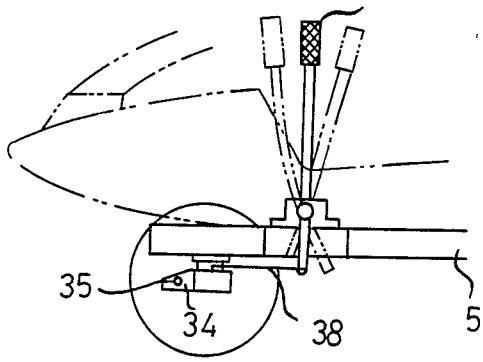
FIG. 11 is a fragmental side view of the embodiment in FIG. 10.

In addition to the engagement of the clutches for the driving wheels, the steering system can also be applied to the front wheels of the carriage as well, such as that designed in popular cars. In FIGS. 10 and 11 showing another example of the steering system, front wheel bearings 3a and 3a are rotatably mounted on the dolly 5 through king pins 33, and tie-rod arms 34 extended forwards of the respective side bearings 3a and 3a are connected by a tie-rod 35 at the tip ends thereof. A steering knuckle arm 36 extending from the bearing 3a on one side is rotated by a handle bar 37 disposed on the dolly 5 through a linkage 38, thus simultaneously steering the front wheels.

Figure 12:
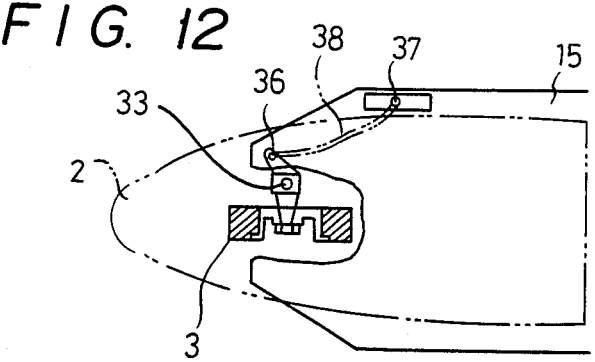
FIG. 12 is a fragmental plan view of an additional embodiment according to the invention.

FIG. 12 shows a further steering system in a carriage with a single front wheel. The like reference numerals are provided for the like parts as those in FIGS. 10 and 11, so a further explanation is eliminated.

In an additional embodiment, steering can be carried out by interlocking the swing of the nozzle with front wheels, with sufficient space given between the nozzle and the input shaft therein.

In a very simple carriage, the braking or steering system may be omitted.

As described above, a carriage adapted for a watercraft according to the invention, can be moved by driving wheels driven by the watercraft's engine power through the power take-off means on the watercraft on board, and, further, can relieve the rider of physical labor necessary for loading/unloading the watercraft, and realize an easy transport of a watercraft over a long distance as well as over a short distance even by the rider alone.

This provision of the clutches on the shaft for the driving wheels enables a carriage to be steered as well as pulled by a car or trailer.

Furthermore, provision of a waterproof feature for a carriage allows a watercraft to be direct loaded or unloaded even in shallows.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A carriage for transporting a watercraft on land, comprising: a dolly carrying a watercraft having an inboard prime mover and a power take-off means from that inboard prime mover; said dolly having plural wheels including driving wheels, rotatably supported by shafts on said dolly;

an input shaft connected to said power take-off means to transmit the prime mover's power in the form of torque;

power transmission means fixed on said dolly to transmit torque from said input shaft to said driving wheels, said torque propelling the carriage by being transmitted via said power transmission means from said power take-off means of the watercraft loaded on said dolly to said driving wheels; and means for steering said carriage when said carriage is being propelled, said steering means including:

manual lever means movably mounted on the watercraft;

a steering means mounted on the carriage; and an interlocking means between said manual lever means and said steering means on the carriage for transmitting movement of said watercraft mounted lever means to said steering means to guide the carriage, said manual lever means includes a steering handle bar on the watercraft and levers located on both sides of said steering handle bar on the watercraft and wherein said steering means on the carriage includes clutches on said carriage for controlling the driving wheels, and said interlocking means includes means for transmitting the movement of said manual lever means to said clutches respectively for engaging/disengaging said clutches.

2. A carriage as claimed in claim 1, wherein said watercraft includes a steering nozzle coupled to said steering means and said steering means on the carriage includes steerable front wheels, said interlocking means including means for interlocking said watercraft steering nozzle and said front wheels.

* * * * *